United States Patent [19]

Purvis

[11] 4,274,963
[45] Jun. 23, 1981

[54] SOLIDS AND LIQUID SEPARATING APPARATUS

[76] Inventor: Robert D. Purvis, Rte. 1, Box 54, Sidney, Mont. 59270

[21] Appl. No.: 12,225

[22] Filed: Feb. 14, 1979

[51] Int. Cl.³ .......................................... B01D 43/00
[52] U.S. Cl. .................................. 210/320; 210/523; 209/464
[58] Field of Search ................ 210/21, 320, 513, 520, 210/522, 523; 209/2, 430, 458, 460, 463, 464, 461, 450, 446

[56] References Cited

U.S. PATENT DOCUMENTS

| 976,923 | 11/1910 | Rothwell | 209/463 X |
|---|---|---|---|
| 1,050,598 | 1/1913 | Bassett | 209/458 |
| 1,292,237 | 1/1919 | Blomfield | 209/463 X |
| 1,352,882 | 9/1920 | Donegan | 209/458 |
| 1,458,234 | 6/1923 | Miller | 210/19 |
| 1,986,897 | 1/1935 | Shaw | 210/19 |
| 2,135,957 | 11/1938 | Wuensch | 209/464 X |
| 2,577,754 | 12/1951 | Hardinge | 209/430 |
| 3,196,141 | 7/1965 | Bradford | 210/320 |
| 3,695,427 | 10/1972 | Friesz | 209/2 |

FOREIGN PATENT DOCUMENTS 1236562 6/1960 France ...................... 209/463

Primary Examiner—Ivars C. Cintins
Assistant Examiner—E. Rollins Gross
Attorney, Agent, or Firm—Harvey B. Jacobson

[57] ABSTRACT

The apparatus comprises a container having a V-shaped bottom disposed at an incline. Along the apex of the V, there is positioned an auger which has an exit extending out of the container at the top of the incline. A plurality of baffles extend transversely of the auger. As a solids laden mud is introduced into the container at the lowest point of the incline, the liquid part of the mud climbs over the baffles and exits at outlets positioned toward the top of the incline while the solids become entrapped between the baffles and fall into the auger which carries them upwardly and out of the container.

3 Claims, 5 Drawing Figures

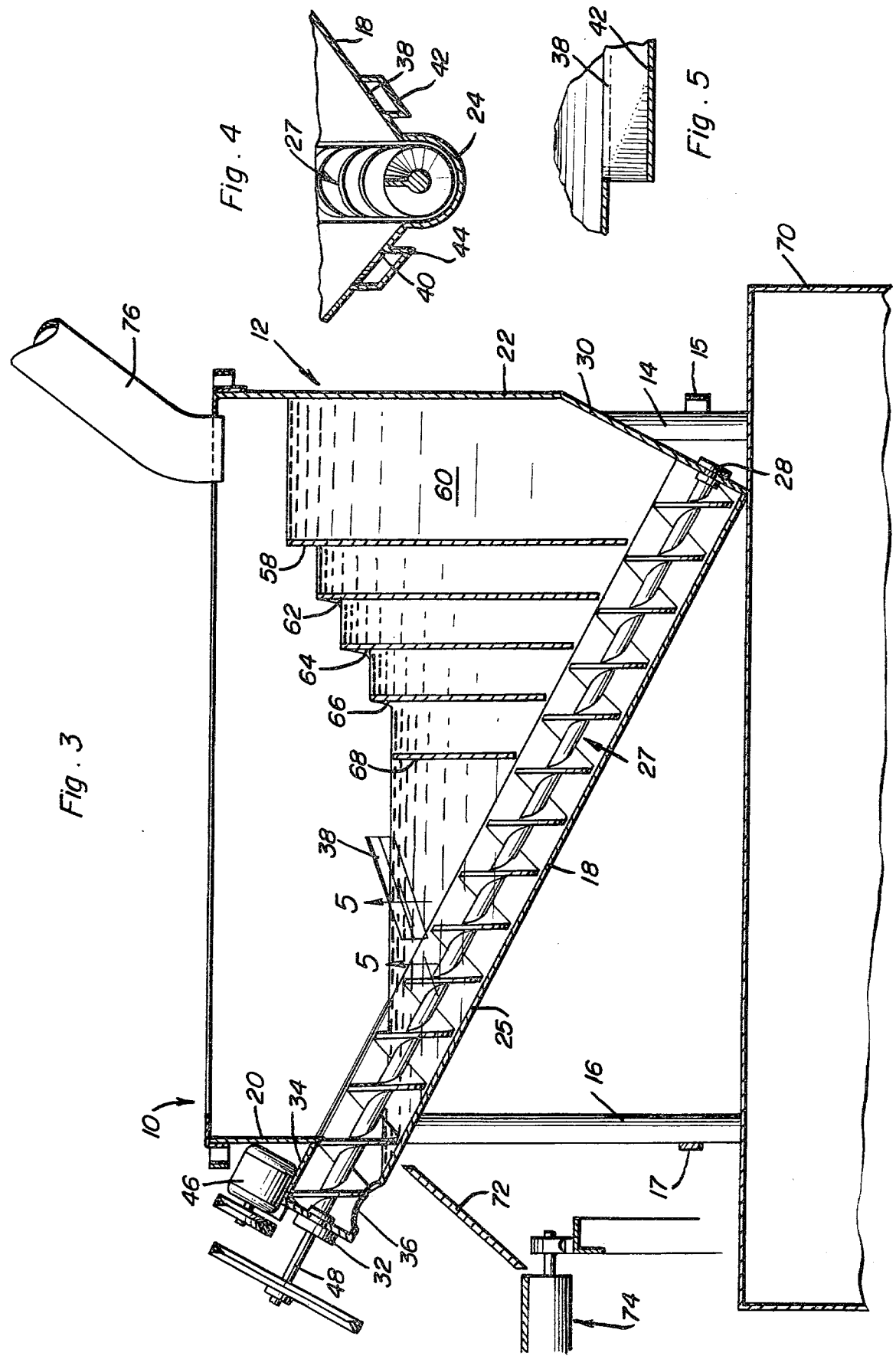

SOLIDS AND LIQUID SEPARATING APPARATUS

BACKGROUND OF THE INVENTION

1. Field of the Invention

This invention relates to separators and particularly to separators for removing sand, cuttings, and the like from mud used in a well drilling operation.

2. Description of the Prior Art

In the process of drilling wells for recovering oil, gas, water, and the like, it is customary to introduce a drilling fluid, commonly referred to as mud, into the drill string. The mud circulates fom a mud pump, through the drill string to the bottom of the well bore, picks up the bit cuttings and brings them to the surface in a constant stream.

As the mud is a carefully blended mixture of ingredients such as bentonite clay, caustic soda, corn starch wood fiber, and the like, it is necessary to preserve the mud for future use. Accordingly, as the mud emerges from the well through a flow line, it is conventionally passed onto the vibrating screen of a shale shaker. The screen allows the mud to pass through to a ditch beneath the shaker, while the cuttings are retained on the screen and then unloaded for final discard.

In addition to the standard shale shaker, U.S. Pat. No. 1,458,234, issued June 12, 1923, to Miller, shows another device intended for the separation of particles from a well drilling fluid. In the Miller device, air under pressure is introduced into a container of drilling mud. The air rises within the container and causes a concentration of heavier particles which migrate toward the lower end of the container by gravity, while the clean mud liquid flows over a baffle at an upper end of the container.

U.S. Pat. No. 2,577,754, issued Dec. 11, 1951, to Hardinge, shows a classifier whereby particle laden fluid is disposed within a container. The particles settled by gravity upon an upwardly inclined conveyor which removes them from the container. U.S. Pat. No. 1,050,598, issued Jan. 14, 1913, to Bassett, shows a mechanism for separating gold from gravel bearing water. The mechanism includes an inclined box having an inlet at the top of the incline. A plurality of baffles extend transversely of the box and create eddy currents in the water as it passes thereover. These eddy currents tend to allow the gold to settle between the baffles.

SUMMARY OF THE INVENTION

The present invention comprises a container having an inclined V-shaped bottom. An auger is disposed in the apex of the V and includes a discharge chute disposed at the top of the incline. A plurality of transverse baffles are included in the container and extend perpendicularly to the axis of the auger. The plurality of baffles decrease in height with the baffle over the lower end of the auger being the highest. A pair of fluid outlets are formed in the sides of the bottom, with one outlet being on each side of the auger. The baffles are positioned below the auger outlet such that well drilling mud which is introduced above the lower end of the auger may travel over each baffle individually and flow out of the fluid outlets. Meanwhile, the route taken by the mud over the baffles forces any cuttings to gravitate from the fluid and become entrapped in the flighting of the auger. The auger then pulls these particles upwardly at which time they are discharged through the auger discharge.

Accordingly, one object of the present invention is to provide an apparatus for separating solids from liquid material which is effective in removing substantially all of the solids, yet requires a minimum of components, thereby making it rugged and reliable.

A further object of the present invention is to provide a solids and liquid separating apparatus which can continuously separate solids and liquified material, thereby making it amenable for use as a mud separator in a drilling operation.

Yet another object of the present invention is to provide a solids and liquid separating apparatus which utilizes the difference in specific gravity between the liquified material and the solids material to aid in causing a separation thereof.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a side elevational view taken substantially along a plane passing through section line 3—3 of FIG. 1.

FIG. 4 is an enlarged fragmental sectional view taken substantially along a plane passing through section line 4—4 of FIG. 1.

FIG. 5 is an enlarged fragmental sectional view taken substantially along a plane passing through section line 5—5 of 3.

DESCRIPTION OF THE PREFERRED EMBODIMENT

Figure 1:
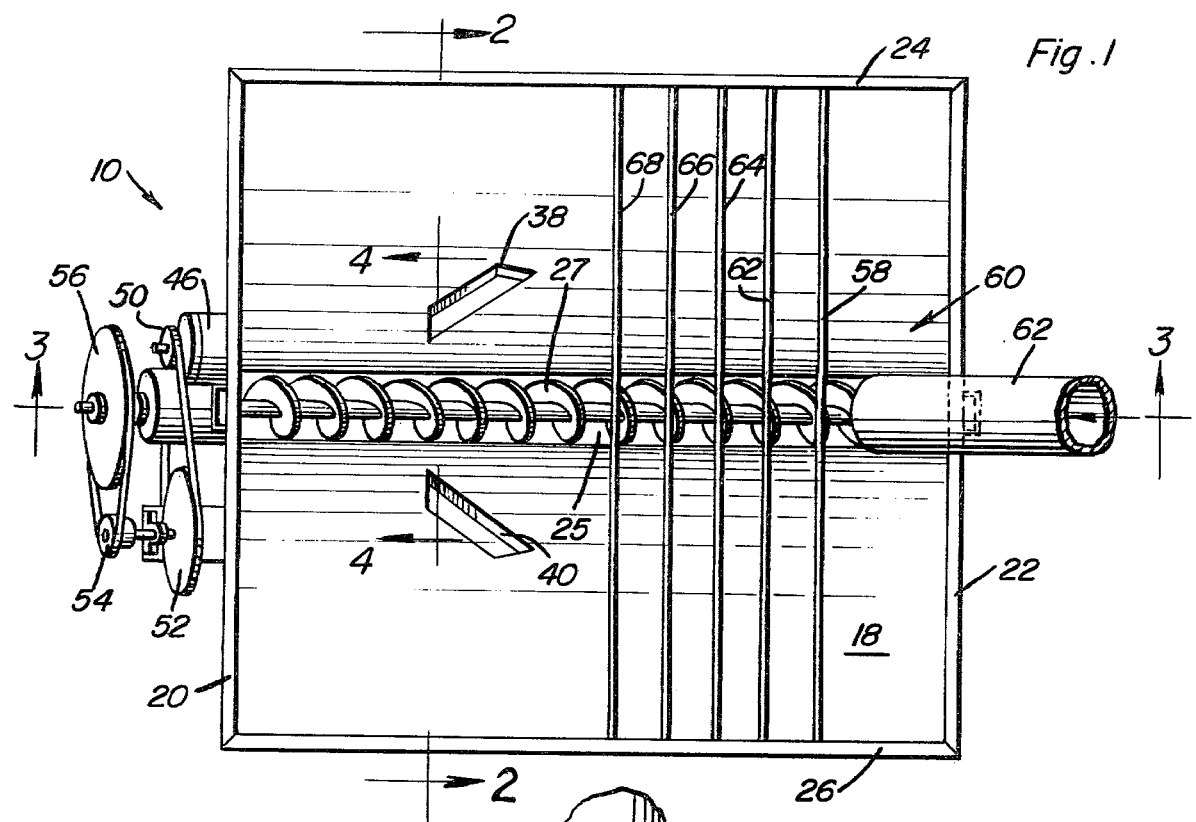
FIG. 1 is a top plan view of the separating apparatus of the present invention.
Figure 2:
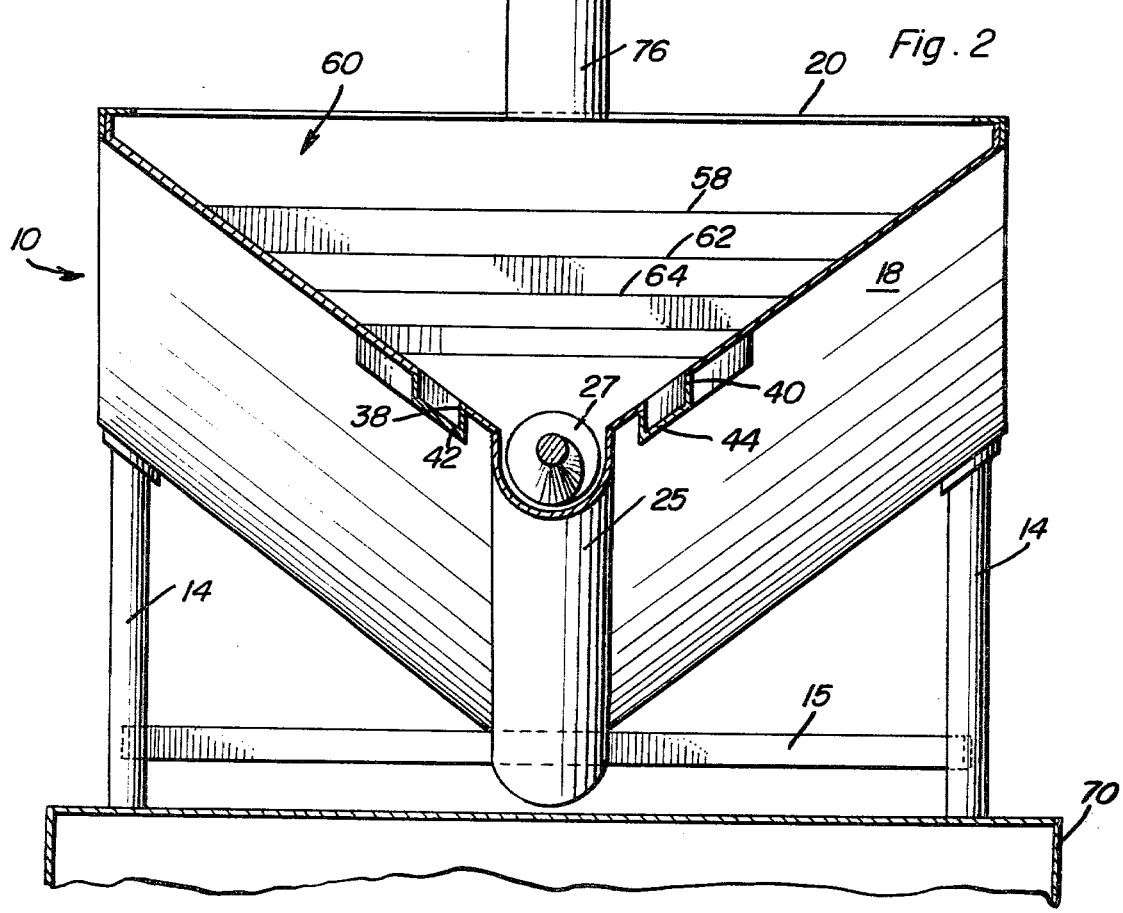
FIG. 2 is an elevational sectional view taken substantially along a plane passing through section line 2—2 of FIG. 1.

Now with reference to the drawings, the solids and liquid separating apparatus, generally referred to by the numeral 10, will be described in detail. The apparatus includes a main body 12, which takes the form of a container and is supported by a pair of rear legs 14 and a pair of front legs 16. The body includes a bottom, V-shaped wall 18 which is inclined downwardly from front wall 20 to the rear wall 22. A pair of side walls 24 and 26 complete the enclosed container which is watertight except for three ports as will be discussed hereinafter. Appropriate reinforcing struts, such as strut 15, which passes betweem and is solidly fixed to the rear legs 14 for adding support thereto and strut 17, which passes between the front legs 16 for supporting these legs may be included, as desired.

Disposed in the apex of the V-shaped bottom is a semi-cylindrical trough 25, which partially surrounds and serves as a housing for the discharge auger 27. Auger 27 is supported and journaled by bearing 28 which is mounted in lower section 30 of rear wall 22. Section 30 is disposed at a right angle to the axis of auger 27 for facilitating the mounting of bearing 28. The auger 27 extends upwardly beyond front wall 20 and is surrounded by housing extension 34 wherein a second bearing, bearing 32, is mounted for supporting and journaling the opposite end of the auger. Disposed in the lower portion of housing extension 34 is a solids discharge port 36 through which the separated solids are removed from the body 12.

Also included in the bottom wall 18 are a pair of liquid discharge ports 38 and 40. These ports are positioned below the level of the solids discharge port 36 and are connected, respectively, to liquid discharge chutes 42 and 44. Discharge chutes 42 and 44 provide a path for the exiting liquid, which may be channeled to any desired location.

In order to drive the auger, an electric motor 46 is mounted to the housing extension 34 and connected to auger shaft extension 48. Motor pulley 50 is mounted on a motor shaft and is connected to drive pulley 56. Speed reduction pulleys 52 nd 54 may be included if needed.

Mounted within the body 12 are a plurality of baffles which serve to enhance the gravity initiated separation of solids and liquids deposited in the apparatus. The first baffle, referred to by the numeral 58, is located approximately 18" from rear wall 22 thereby defining the mixture receiving section 60. The next baffle, baffle 62, is positioned approximately 6" ahead of baffle 58 and has a height which is approximately ¾" lower than baffle 58. A similar relationship exists between baffles 62, 64, 66 and 68, with each progressive baffle being spaced 6" from the preceding baffle and extending to a height approximately ¾" lower than the preceding baffle. Each baffle is firmly connected to bottom wall 18 except for one opening through which auger 27 is allowed to pass.

In operation, the entire apparatus may be disposed above a mud tank 70 such that any liquid exiting from discharge ports 38 and 40 will fall directly into the mud tank, which constitutes a supply of drilling fluid at a drilling site. Further, solids discharge port 36 would be disposed above a conveyor apparatus such as depicted by ramp 72 and conveyor 74 in order that any separated solids may be removed and disposed of in any convenient manner. The mud line discharge 76 is positioned above receiving section 60 and the flow of combined particles and liquid material is initiated. Auger motor 46 would be operative at this point and auger 27 should be rotating. As the combined mixture fills section 60, a portion of the particles would gravitate downwardly into chute 25 where they would be caught by auger 27 and moved to solids discharge port 36 at which time they would be carried away by conveyor 74. After section 60 is filled, the mud would spill over into the next section where additional solids would be removed by auger 27. The process would be repeated until the remaining purified mud would spill over baffle 68 and flow out of ports 38 and 40 to be returned to mud tank 70. It should be noted that by the use of progressively lower baffle heights, the progressively cleaner mud would be precluded from backwashing into the previous section of the separator, thus insuring that each section between progressive baffles contains likewise progressively cleaner liquid material. It will also be noted that the amount of solids removed from the mixture is dependent upon the number of baffles, with a cleaner fluid discharge being obtained by an increase in number of baffles.

Certain additions and/or modifications to the present invention can be envisioned. For instance, it may be desirable to include an access door in rear wall 22 proximate the lower end of auger 27 in order to allow cleaning of the auger or providing overflow in the event that the fluid mixture flow rate increases to a rate where there may be a danger of losing mud through the solids discharge port 36.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for separating solid drilling bit cuttings from drilling mud, said apparatus including a horizontally elongated container defining inlet and outlet ends and an inclined bottom extending between said ends, said bottom being V-shaped in transverse cross section and having its lower end disposed at said inlet end and its higher end disposed at said outlet end, an elongated inclined conveyor disposed in and paralleling the apex of said bottom, said apex of said bottom including a solid cuttings outlet in the upper end thereof to which said conveyor is operative to upwardly convey solid cuttings gravitating downwardly into said apex, said container including a mud outlet spaced below the level of said solid cuttings outlet, a plurality of upstanding transverse weir baffles mounted in said container and laterally spaced apart longitudinally of the inlet end of said container, said mud outlet being spaced longitudinally of said container between said solid cuttings outlet and the adjacent weir baffles, said weir baffles extending upwardly to progressively lower elevations toward said outlet end of said container and extending downwardly therein to levels adjacent said conveyor, the upper extremity of the lowest weir baffle being horizontally aligned with said mud outlet, a well mud line discharge opening into said container on the side of the highest weir baffle remote from said outlet end of said container, and mud tank means operatively associated with said mud outlet for receiving mud discharged therefrom.

2. The apparatus of claim 1 wherein said mud outlet includes a pair of horizontally registered mud outlet openings formed in opposite side portions of said container on opposite sides of a vertical plane containing said conveyor.

3. The combination of claim 1 wherein said conveyor includes an upwardly opening generally semi-cylindrical trough extending along said bottom and having a journaled auger screw disposed therein.

* * * * *